United States Patent [19]

Reiser

[11] 3,934,366

[45] Jan. 27, 1976

[54] SYSTEM FOR PRODUCING VARIABLE STATIC LIGHT DISPLAYS

[76] Inventor: Robert Reiser, 9014 Melrose, Los Angeles, Calif. 90069

[22] Filed: Mar. 6, 1974

[21] Appl. No.: 448,540

[52] U.S. Cl.................. 40/130 B; 35/7 A; 40/142 A
[51] Int. Cl.² ......................................... G09F 13/00
[58] Field of Search .......... 40/130 R, 132 R, 130 E, 40/130 B, 28 C, 142 A, 106.45, 143; 35/7 A, 16

[56] References Cited
UNITED STATES PATENTS

| | | | |
|---|---|---|---|
| 1,735,883 | 11/1929 | Smith.............................. | 40/142 A |
| 2,100,148 | 11/1937 | Parker............................ | 40/130 E X |
| 2,643,466 | 6/1953 | Bucher........................... | 40/142 A UX |
| 2,759,295 | 8/1956 | Keuls ............................. | 40/143 UX |
| 2,783,366 | 2/1957 | Jellinek ......................... | 35/19 B UX |
| 3,251,985 | 5/1966 | Krupnick ....................... | 40/130 R X |
| 3,339,297 | 9/1967 | Stinn et al.................... | 40/142 A UX |

FOREIGN PATENTS OR APPLICATIONS

| | | | |
|---|---|---|---|
| 393,901 | 11/1965 | Switzerland...................... | 40/142 A |

Primary Examiner—Louis G. Mancene
Assistant Examiner—John F. Pitrelli
Attorney, Agent, or Firm—Robert M. Ashen

[57] ABSTRACT

A system for producing a variety of static multicolor light displays includes a plurality of different colored translucent image-producing elements. A light source is positioned to direct light through the image-producing elements and onto a display surface. The image-producing elements are three-dimensional and positionable to produce a variety of different static visual and aesthetic displays. The image producing elements are detachably held in position, against a base which may comprise all or part of the display surface. To provide the capability of vertically suspending the system, like a painting, the elements may be held in position by magnetic force or means such as pegs as mechanical interlocks or adhesives. Such means, or others, such as weights, may be employed for systems positioned horizontally. The light source may be attached to the base to provide a self-contained unit. A virtually limitless variety of static effects and compositions is achievable by combining pluralities of image-producing elements of various colors and in various positions with respect to the light source and the display surface.

11 Claims, 5 Drawing Figures

U.S. Patent  Jan. 27, 1976  3,934,366
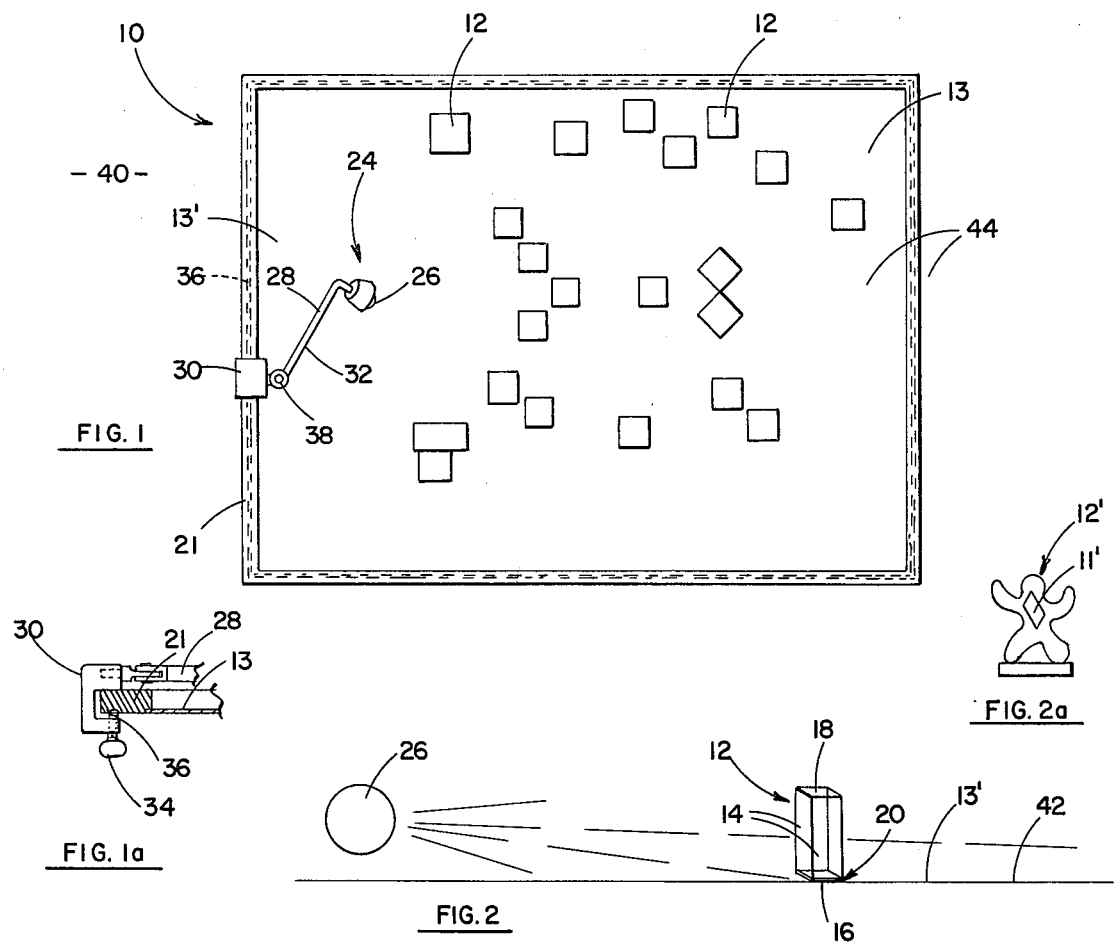
FIG. 1
FIG. 1a
FIG. 2
FIG. 2a
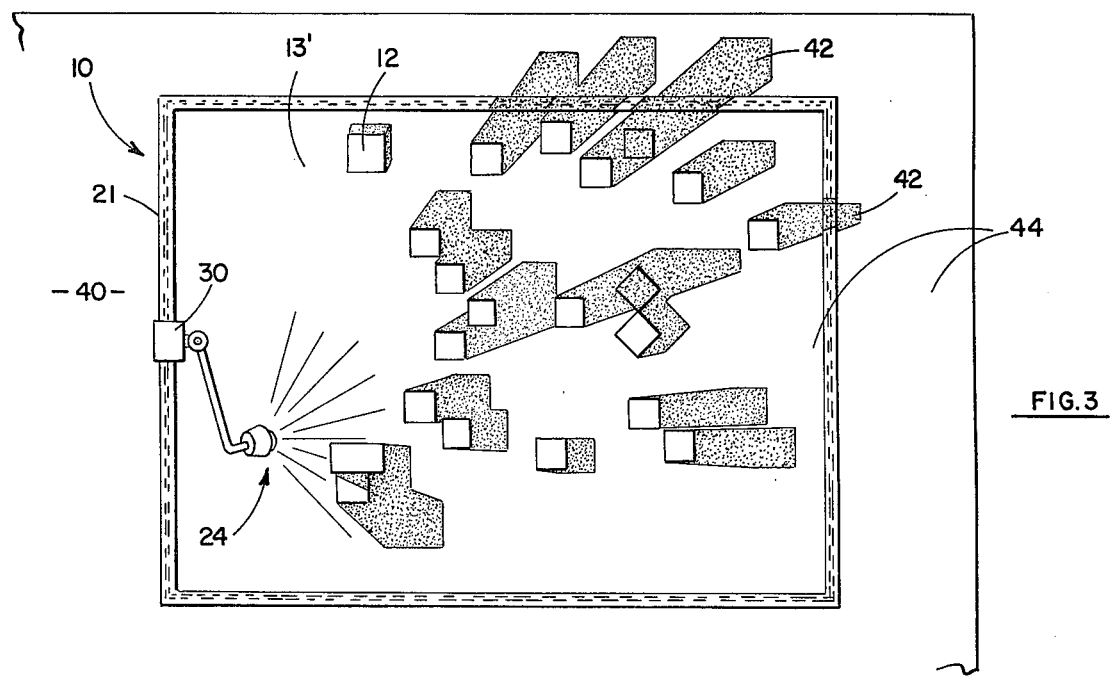
FIG. 3

SYSTEM FOR PRODUCING VARIABLE STATIC LIGHT DISPLAYS

BACKGROUND OF THE INVENTION

The invention relates to systems and methods for achieving static visual displays by the arrangement of image-producing elements relative to projected light.

DESCRIPTION OF THE PRIOR ART

In recent years, a number of previously unconventional forms of entertainment has become popular. This is particularly true for forms of entertainment which provide opportunities for creativity and participation on the part of persons having no special training or background. Light shows, in particular, have become popular. In such activity, light displays of striking colors and various shapes are presented to a viewer for their aesthetic and psychological effects. Numerous existing devices for providing such presentations exhibit certain disadvantages and drawbacks. For example, a common device comprising a generally spherical array of colored mirrors for providing reflected light images is relatively limited in the shape and color combinations which it can generate due to the fixed shapes and relationships of the respective mirrors. Other such devices produce consistant movement which may be of a frenetic quality. Moreover, such devices tend to be complicated, cumbersome, fragile, and expensive. Other devices in the field exhibit these or other disadvantages.

Therefore, there has been a felt, but unfulfilled need for a system for producing a large variety of individual, static light displays, which system is relatively uncomplicated in structure, sturdy, easily replaceable, and relatively inexpensive.

A system for producing a variety of different static light displays includes at least one three-dimensional image-producing element. The element may have at least a translucent portion which may be colored. The system further includes a light source positioned to direct light towards the image-producing element. The image-producing element is movable to a variety of stationary positions which each produce a different static visual display. The element may be detachably held in place at each position upon a base by means limiting movement along the base. Such means include magnetic force or mechanical interlocks to provide capability of vertically suspending the system, in the manner of a painting. A background or display surface for receiving images transmitted by the image-producing element may comprise a surface of the base, and may comprise another surface such as a wall or a ceiling. Combination of a plurality of image-producing elements in various positions produces displays comprising a virtually limitless range of visual effects and compositions, which may include overlapping as well as separate images of the elements as well as the elements themselves. Such compositions and displays may be striking and aesthetically pleasing regardless of the level of artistic training of the user of the invention. The light source may be attached to the base to form a self-contained unit.

IN THE DRAWINGS

FIG. 1 comprises an elevational view of a display-producing system;

FIG. 1a comprises an enlarged fragmentary view of a portion of the system of FIG. 1;

FIG. 2 comprises an enlarged schematic view of a portion of the display-producing system of FIG. 1;

FIG. 2a comprises an enlarged view of an alternate image-producing element; and

FIG. 3 shows the display-producing system of FIG. 1 in another arrangement.

As depicted in FIGS. 1–3, a system 10 for producing variable light displays includes a plurality of different colored image-producing elements 12. As shown below, the invention in many applications involves a plurality of image-producing elements 12. A single element 12 may be employed for some applications. Elements 12 are three-dimensional and may be of arbitrary shape. As shown in FIG. 2, the elements are configured as rectangular, parallelapipeds; an alternative shape is depicted in FIG. 2a as element 12'. The elements 12 have at least portions which are of translucent material, such as crystal or certain types of plastics and other materials, and may be of various colors, as desired. Elements 12 are entirely of such a translucent colored material (except for an inner end wall 16 described below); element 12' (FIG. 2a) has a colored translucent inset portion 11'.

An image-producing element 12, depicted in an operative position, is elongated and extends outwardly from a base 13 so that a translucent portion is spaced from the base. The base 13 has a surface 13' which is in contact with element 12 and may comprise a display surface, as described in detail below. The element 12 comprises four lateral walls 14 and an inner end wall 16, disposed at an inner end of element 12 and in contact with surface 13'. An outer end wall 18 is disposed at an outer end of element 12, opposite wall 16. Wall 16 comprises means 20 for detachably holding element 12 upon surface 13' to limit movement relative to the surface 13'. In the depicted embodiment, the attaching means 20 comprises magnetic material composing wall 16. Surface 13' is composed of steel or like material. The depicted embodiment, in which elements 12 are held in place by magnetic force against surface 13', is particularly appropriate for applications in which the image-forming system is utilized as a wall hanging or ornament, as described in detail below. In such embodiments, other attaching means including mechanical interlocks such as pegs may also be employed. In other embodiments, for example, where the surface 13' is generally horizontal, simple weights may be used, as well as other conventional means. The attaching means 20 holds element 12 in a given position against the surface 13' so that, for a given array of elements, tipping, vibration, or other minor disturbance will not disarrange the position, while permitting ready repositioning (rearrangement) through manual manipulation. Element 12 may be molded or fabricated by other conventional means. Wall 16 is affixed to walls 14 by adhesives, heat-fusing or other conventional means. In other embodiments than that depicted, in which other embodiments of image-producing elements are detachably held upon a surface 13' by a weighted inner wall or other means, surface 13' may be of material such as wood or plastic.

Surface 13' is, as depicted, substantially planar. This facilitates motion of element 12 along the surface during repositioning of the element. The base 13 is mounted within a frame 21. Frame 21 is in the form of a hollow rectangle which retains base 13 in the same manner as does the frame of a conventional painting.

A light source means 24 comprises light bulb means 26 attached to a mounting means 28. The light source means may comprise high intensity lighting means as well as means providing less intense illumination. Mounting means 28 comprises a mounting base 30 and an extension or neck 32. Base 30 is movably affixed to frame 21. The illustrated base 30 is in the form of a C-clamp having a screw 34 which is tightenable to engage a seating groove or channel 36 at the underside of frame 21 to hold the light source means 24 in place. Groove 36 extends around frame 21 to permit means 24 to be selectively positioned. Neck 32, as depicted, includes at least one joint 38 for adjusting the angle of incidence of light from light source 24. The angle of incidence may, of course, be changed by varying the height of the bulb as well as its lateral position with respect to the base. Other configurations for member 32, such as the flexible member of a "gooseneck" lamp, may also be employed in accordance with the invention. Thus, the depicted embodiment comprises a self-contained unit. The light source means may be a separate unit.

In operation, as depicted in FIG. 3, system 10 in accordance with the invention is placed in a location chosen by the user. Such location may comprise a surface of a coffee table, a display case, or, as depicted, a wall 40 upon which system 10 is hung. System 10 may be hung in the same manner as a conventional painting, namely, by affixing a wire (not shown) to the back of the device, as by a screw arrangement and hanging the wire from a nail or other object protruding from the wall. The elements 12 are then arrayed by manual manipulation in a manner chosen by the user, and light source means 24 is then positioned. These steps may, of course, be reversed if desired. The elements 12 are held in the chosen static array by the magnetic force between the base 13 and the inner end walls 16 of the elements 12. Upon turning "on" of light bulb means 26, incident light therefrom impinges on and passes through elements 12. This results in the formation of a static visual display comprised of light projections 42 formed on a display surface 44 by light directed through the elements 12. Surface 44 may comprise base surface 13' as well as adjoining surfaces such as wall 40. The display includes separate images and overlapping images of the elements 12; the elements 12 themselves comprise a portion of the display. As depicted, the particular orientation of the image-producing elements 12 and the particular angle of incidence of light from the source means 24 result in a striking display of color and form, light, and shadow. The display may be varied to the taste of the user by repositioning of an element or elements 12 and of the angle of incidence of light from source 24 through movement of neck 32 or of mounting base 30. Further, an opaque element such as 12' (FIG. 2a) would cast a shadow; where a translucent colored portion 11' is also provided, the shadow would be combined with a colored image. In this manner, any number of different static light compositions and displays of striking, dramatic, and aesthetic character may be created by users of the invention, regardless of the artistic training or background of the user.

The force of magnetic attraction between surface 13' and inner walls 16 of elements 12 affords the capability of a stable array of elements and thus a relatively stable display, together with flexibility permitting virtually infinite variation of the composition in accordance with the user's taste.

Though specific embodiments of the invention have been described and depicted above, the invention is defined by the following claims interpreted in the light of the specification.

I claim:

1. A system for producing a variety of different static light displays comprising:
    a plurality of three-dimensional colored image-producing elements comprised of planar surfaces;
    a base having an image-surface;
    means for removably holding said image-producing elements in a plurality of different stationary positions against said base surface in a manner limiting movement of said elements along said base surface, said image-producing elements extending outwardly from said base surface, said image-producing elements each having at least a colored, translucent portion which defines a generally planar exterior surface, said portions being spaced from said base surface and colored other than black or white; and
    a single light source means associated with and positioned relative to said image-producing elements and said base surface so as to project a diverging beam of light, portions of said beam passing directly from the single light source means, striking said planar exterior surfaces of said translucent colored portions of the elements, passing through said portions, and continuing on to strike said base surface to produce colored images on said base surface, other portions of said light beam passing directly from said light source means past said elements for a substantial distance to either side of said elements to directly strike said base surface.

2. The invention as set forth in claim 1 wherein said means for holding said image-producing elements against said base surface comprises means for producing magnetic attraction between said image-producing elements and said base surface.

3. The invention as set forth in claim 2 wherein said base surface is metal and said image-producing element comprises a three-dimensional body having a magnetic inner surface for magnetic engagement with the base surface.

4. The invention as set forth in claim 1 further including means for mounting said light source means upon said base.

5. The invention as set forth in claim 4 wherein said mounting means is adjustable between various stationary positions to vary the path of the light projected by said light source means.

6. The invention as set forth in claim 1 wherein the translucent portions of said image-producing elements have a plurality of different colors.

7. The invention as set forth in claim 1 wherein said image-producing elements are substantially entirely translucent.

8. The invention as set forth in claim 1 wherein the image-producing elements have a plurality of different configurations.

9. The invention as set forth in claim 1 wherein said image-producing elements comprise parallapipeds having long dimensions extending outwardly from said base surface.

10. The invention as set forth in claim 1 further including means affixed to said base for suspending said base in a generally upright position.

11. The invention as set forth in claim 1 wherein said base surface is generally flat and smooth to facilitate repositioning of said elements.

* * * * *